United States Patent Office 3,055,399
Patented Sept. 25, 1962

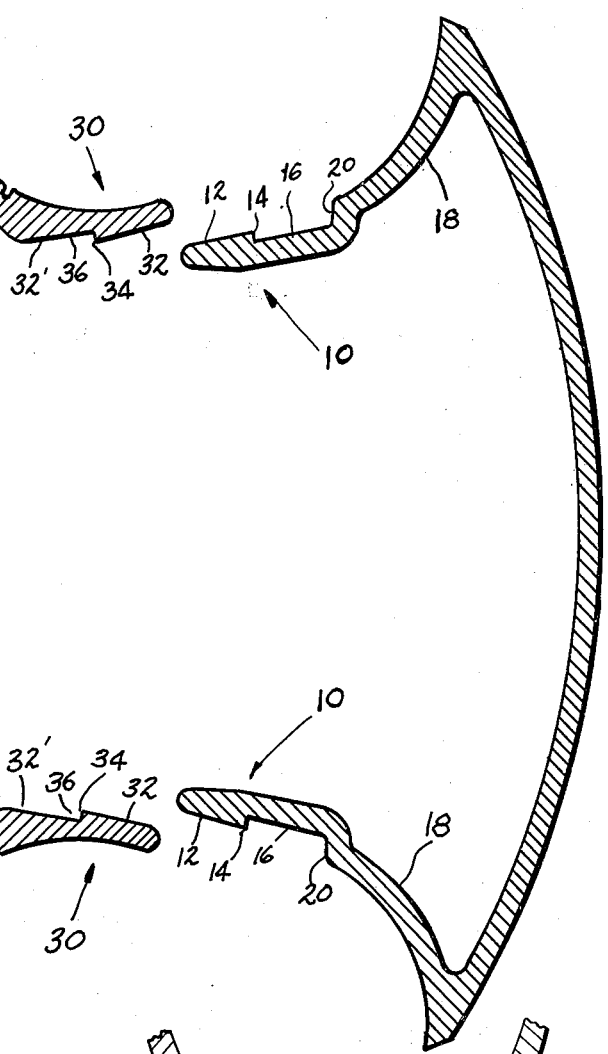

3,055,399
ARTICLE AND METHOD OF FORMING
John P. Bush, Hamden, and John A. Scott, North Haven, Conn., assignors to Olin Mathieson Chemical Corporation, a corporation of Virginia
Filed Mar. 1, 1960, Ser. No. 12,067
4 Claims. (Cl. 138—157)

The present invention relates to a method of forming articles and particularly to a method of forming relatively long, bulky, hollow metal articles.

It is known that the extrusion of aluminum elements, the cross-sections of which are solids, cost less than extrusions which are hollows or semi-solids. The relative increase in cost in going from solids to semi-solids is of the order of 10% and an additional percentage must be added in going from semi-solids to hollow extrusions. This later percentage cannot be easily approximated as it depends on the complexity of the cross-section of the hollow piece.

It is one object of the present invention to provide a method of forming elongated extruded hollow articles of complex cross-section at relatively low cost.

A requirement which is often made of hollow articles of complex cross-section is a requirement for fabrication to relatively close tolerances. This need arises because the extruded part must often be used with other parts in a structure which requires precision fit of joints.

Another object of this invention is to provide a method of forming bulky articles of complex cross-section and close dimensional tolerances at relatively low cost.

Other objects will be in part apparent and in part pointed out in the description which follows.

In one of its broader aspects the objects of the present invention are achieved by extruding a first elongated wall element having a first pair of approximately parallel opposed longitudinal margins, extruding a second elongated wall element having a second pair of approximately parallel opposed longitudinal margins, said second pair of margins being operative to overlap and interlock with said first pair to form two opposed two-ply wall portions of said member, the confronting faces of said margins being provided with longitudinal grooves and protuberances, cleaning and coating said faces with a liquid bonding adhesive, effecting a self-jigging of said sections by joining said sections to mate said grooves and protuberances, and curing said adhesive to a solid while said sections are jigged.

The manner in which these and other aspects of the invention are realized will be clear from the attached drawings in which FIGURE 1 is a cross-section of one elongated wall element.

FIGURE 2 is a cross-section of a mating elongated wall element.

FIGURE 3 is a cross-section of a detail of a joint formed between the marginal portions of the elements of FIGURES 1 and 2.

FIGURE 4 is a cross-section of a detail of an alternative form of joint.

Referring first to FIGURE 1, a cross-section of an elongated wall element is shown. This element is preferably formed of metal such as aluminum, magnesium, brass, or other metal which can be extruded. Alternatively, a metal member may be formed by other metallurgical techniques into an elongated element having a configuration similar to that indicated. While the section may have a variety of configurations in its main structural portion the essential portions of the element for purposes of this invention are the margins, or longitudinally extending edge portions indicated generally as 10. As is evident from the figures, these margins form a pair of approximately parallel opposed longitudinal strips integrally attached to the main structural portion of the element. For an element of aluminum the margins are extruded as integral parts of the structure. The margin portions of the element of FIGURE 1, while approximately parallel to each other, are seen to be disposed at a slightly convergent angle, particularly the outer surfaces or faces thereof 12. In the configuration shown these faces are disposed at an angle of about ten degrees from plane parallel. As used in this application the term approximately parallel margins includes a divergence or convergence of surfaces of said margins of the order of ten degrees from plane parallel.

The faces 12 of the margins have formed integrally therewith longitudinally extending lips or protuberances 14. Between the lips 14 and the adjacent structural portions 18 of the element are two recesses 16 and stops or shoulders 20 the functions of which will be described with reference to FIGURE 2.

Referring now to FIGURE 2 a cross-section of a second elongated wall element is shown. It is seen that this element has a main structural portion and two approximately parallel margins or edge portions 30. The margins 30 have a number of pairs of detail parts formed integrally therewith which complement and cooperate with those of the margins 10 when said margins are overlapped and interlocked. The overlapping is facilitated by the alignment of the margins 30 at an angle which is slightly divergent from plane parallel but which is referred to herein as within the scope of the term approximately parallel. This slightly divergent alignment is particularly with respect to the internal surfaces or faces 32 of the margins 10. A pair of longitudinally disposed protuberances or lips 34 is formed integrally with the margin and this is one of the structural elements defining a pair of longitudinally disposed grooves or recesses 36. The divergent interval faces 32 of margins 30 are parallel to the stepped similar faces 32 which form another interval surface portion of the margins 30.

One particular feature of the present invention is that it provides margins on structural elements which are formed integrally therewith, and which are operative to be overlapped and interlocked to provide a self-jigging of the bulky structural elements while they are being bonded into an elongated metal structural member of relatively large cross-section.

The form which one set of margins takes when in the self-jigged relation is shown in FIGURE 3. The lands or protuberances 14 and 34 and the recesses 16 and 36 are interlocked to restrain movement of said margins and to in effect align the structural elements during the curing of the adhesive there-between.

The adhesive is preferably applied to the faces of the margins to be mated and serves as a lubricant to facilitate movement of one face over the other. There is a resistance to this movement because the entry of the margins 10 into alignment with the margins 30 requires a wedging and slight separation of the margins 30, as well as a slight approach of the margins 10 toward each other, until the pairs of lands 14 and 34 ride over each other and engage with the respective grooves. It is the slight flexing or deflection of the elements under the wedging action of the margins followed by a slight return of the elements toward their original configuration which effects the self-jigging of the bulky elements. The advance of the edges of the margins 30 is arrested by contact with the shoulder or stop 20 of the other element. Because the confronting surfaces of the margins are inclined at a slight angle from plane parallel, and are lubricated by the liquid adhesive, the pressure acting therebetween causes a close tolerance to develop between the two pairs of protuberances 14 and 34. Accordingly, although both elements are heavy elongated bulky pieces, close overall dimensional tolerances are achieved in the cross-section of the final product.

It is within the scope of the present invention to provide margins on relatively large elongated elements to join said elements by overlapping said margins to develop a force there-between sufficient to hold the elements in alignment during curing of a liquid resin disposed therebetween, but insufficient to provide mechanical support between said elements under use conditions in the absence of a bonding agent.

Referring now to FIGURE 4 an alternative form of a self-aligning bonded marginal joint is shown. In this form an outer marginal piece 40 is provided with a protuberance 42 and an inner marginal piece 44 is provided with a corresponding recess 46. The outer edge 50 and inner edge 48 are spaced from the like parts of the opposite margins (not shown) so that the pair of inner margins may produce a wedging action on the pair of outer margins. This wedging develops a force between the confronting faces of the margins sufficient to cause a self-alignment thereof due to the mating of the recesses and protuberances provided therein.

One particular advantage of the present invention is the production of hollow structural members of large cross-section from extruded elements or wall sections which are classed as solids in the extrusion art. A significant net cost advantage is achieved in this manner with no appreciable loss of properties in the finished piece. For example pieces produced in this manner can be anodized and given other similar treatments with no deterioration in the joint or in the final product.

A suitable procedure for preparing the margins for bonding is as follows:

The element is cleaned by immersion in an alkaline cleaner bath such as Oakite at a temperature of about 180° F. for about ten minutes and then rinsed in hot tap water at about 150° F. for about ten minutes. This is followed by an etch in an etching bath containing about 45 ounces of concentrated $H_2SO_4$ (specific gravity 1.84) and 4.5 ounces of crystaline sodium dichromate per gallon of water. The etch is carried out at about 150° F. for ten minutes. After etching the element is rinsed in a spray of tap water at room temperature. After drying the liquid adhesive is applied to the faces to be joined. A suitable adhesive is that known as M688, a product of the Rubber & Asbestos Corporation. A catalyst product of this company, identified as CH8, is added to the adhesive resin in the ratio of 13 parts of catalyst to 100 parts of resin.

Application of this adhesive to the parts shown in FIGURES 1 and 2 provides sufficient lubrication so that the elements can be put together under hand pressure to form a self-aligned structural member. After joining the elements the member is inserted in an oven at a temperature of 150° F. for thirty minutes.

In making elements in this way it was found that no clamps or other holding or positioning devices were needed to hold the member in proper alignment. Close dimensional tolerances were achieved on the bulky piece without any such clamping or retaining devices.

Other cleaning procedures and adhesives may be used in place of those referred to above.

Since many examples of the foregoing procedures, compositions and articles may be carried out and made, and since many modifications can be made in the procedures, compositions, and articles described without departing from the scope of the subject invention, the foregoing is to be interpreted as illustrative only, and not as defining or limiting the scope of the invention.

What is claimed is:

1. An elongated hollow structural metal member of relatively large cross-section, said article comprising a first elongated wall section, having a first pair of opposed longitudinal margins, a second elongated wall section having a second pair of opposed longitudinal margins overlapping said first pair of margins along a substantial face-to-face area, the confronting faces of said margins being provided with and aligned by longitudinally extending grooves and protuberances and being bonded together with a cured epoxy-type adhesive bonding agent, and the confronting faces of said margins being slightly divergent from a common central plane.

2. The article of claim 1 wherein the dimensions of the grooves normal to said faces are greater than the thickness of bonding agent.

3. An elongated metal structural member of relatively large hollow cross-section, said article comprising a first elongated wall section having a first pair of slightly converging, opposed longitudinal margins, and a second pair of slightly diverging, opposed, longitudinal margins, said divergent pair of margins being wedged by said convergent pair of margins, and forming with said convergent pair of margins two opposed, two-ply wall portions having a substantial face-to-face area between the plys thereof, said margins being overlapped and interlocked by longitudinal grooves and protuberances in the confronting faces of said two-ply wall portions, and said margins being bonded by a cured epoxy-type adhesive disposed between said confronting faces.

4. The article of claim 3 in which the dimension of said grooves and protuberances normal to said confronting faces is greater than the thickness of the adhesive layer therebetween.

References Cited in the file of this patent

UNITED STATES PATENTS

| 859,176 | Hill | July 2, 1907 |
| 2,866,527 | Schilling | Dec. 30, 1958 |
| 2,884,958 | Asselin | May 5, 1959 |

FOREIGN PATENTS

| 332,151 | Great Britain | July 17, 1930 |

OTHER REFERENCES

"Metal to Metal Bonding with Epoxy Resin-Based Adhesives," Product Engineering, July 1954, pages 166–169.